United States Patent
Ehrenberg (10) Patent No.: US 8,056,434 B2
(45) Date of Patent: Nov. 15, 2011

(54) ADVANCING MEANS FOR A MULTI-COORDINATE MEASUREMENT TABLE OF A COORDINATE MEASURING DEVICE AND METHOD FOR CONTROLLING SUCH AN ADVANCING MEANS

(75) Inventor: Tillman Ehrenberg, Schoffengrund (DE)

(73) Assignee: Vistec Semiconductor Systems, GmbH, Weilburg (DE)

( * ) Notice: Subject to any disclaimer, the term of this patent is extended or adjusted under 35 U.S.C. 154(b) by 702 days.

(21) Appl. No.: 12/217,891

(22) Filed: Jul. 9, 2008

(65) Prior Publication Data
US 2009/0013808 A1    Jan. 15, 2009

(30) Foreign Application Priority Data
Jul. 9, 2007 (DE) .......... 10 2007 032 088

(51) Int. Cl.
G05G 11/00 (2006.01)
(52) U.S. Cl. .................................... 74/490.09
(58) Field of Classification Search ......... 74/89, 424.89, 74/424.92, 424.93; 476/61; 248/678, 542, 248/543, 661, 913; 33/1 M; 108/20
See application file for complete search history.

(56) References Cited

U.S. PATENT DOCUMENTS

| | | |
|---|---|---|
| 4,378,709 A | 4/1983 | Chitayat |
| 4,910,446 A * | 3/1990 | McMurtry et al. ............ 318/560 |
| 6,778,260 B2 | 8/2004 | Blaesing-Bangert et al. |
| 6,919,658 B2 | 7/2005 | Kaczynski |

FOREIGN PATENT DOCUMENTS

| | | |
|---|---|---|
| DE | 10140174 A1 | 3/2003 |
| DE | 10236239 A1 | 2/2004 |
| DE | 102005036718 A1 | 2/2007 |
| JP | 2002-310249 A | 10/2002 |
| JP | 2002-310264 A | 2/2006 |
| WO | WO-2007/010364 A2 | 1/2007 |

OTHER PUBLICATIONS

Roth, K.-D. and Rinn, K. "Mask Metrology for High End Semiconductor Application Using the LEICA LMS IPRO," Scientific and Technical Information, vol. XI, No. 5, pp. 130-135, Leica Mikroskopie and Systeme GmbH, Wetzlar/Germany (Oct. 1997).

* cited by examiner

*Primary Examiner* — Thomas R Hannon
*Assistant Examiner* — Phillip A Johnson
(74) *Attorney, Agent, or Firm* — Simpson & Simpson, PLLC (57) ABSTRACT

An advancing means for a multi-coordinate measurement table including a drive unit having a friction rod and a motor for each coordinate axis (x, y). The motor contacts one side of the friction rod with its motor shaft and at least one press roller contacts the other side of the friction rod. At least one pressing means is provided biasing the press roller, the friction rod and the motor shaft against each other with a pressing force, whereby the motor shaft frictionally engages the friction rod and converts the rotational movement of the motor into a linear movement of the friction rod. A method for controlling such an advancing means is disclosed as well.

6 Claims, 6 Drawing Sheets

Fig. 1

(Prior Art)

ADVANCING MEANS FOR A MULTI-COORDINATE MEASUREMENT TABLE OF A COORDINATE MEASURING DEVICE AND METHOD FOR CONTROLLING SUCH AN ADVANCING MEANS

CROSS-REFERENCE TO RELATED APPLICATIONS

This patent application claims priority of German Patent Application No. 10 2007 032 088.6, filed on Jul. 9, 2007, which application is incorporated herein by reference.

FIELD OF THE INVENTION

The present invention relates to an advancing means for a multi-coordinate measurement table. The invention further relates to a method for controlling an advancing means of a multi-coordinate measurement table.

BACKGROUND OF THE INVENTION

Coordinate measurement tables of the type mentioned above are used in high-precision coordinate measuring devices for measuring substrates in the semiconductor industry. A coordinate measuring device having such a coordinate measurement table is described in the article "Maskenmetrologie mit der Leica LMS IPRO für die Halbleiterproduktion" (Mask Metrology with Leica LMS IPRO for Semiconductor Production) by K.-D. Röth and K. Rinn, Mitteilungen für Wissenschaft und Technik, Vol. XI, No. 5, pp. 130-135, October 1997. This measuring device serves for high-precision measurements of the coordinates of the edges of a structural element on a substrate, for example a mask and a wafer.

German Patent No. DE 101 40 174 A1 describes an improved coordinate measurement table of the type mentioned above and a coordinate measuring device for high-precision measurement of the coordinates of the edges of a structural element on a substrate, such as a mask and a wafer. The coordinate measuring device comprises a coordinate measurement table of the type mentioned above, which is displaceable horizontally in the x-direction and in the y-direction. It serves for receiving a substrate having structures whose edge coordinates are to be measured. Furthermore, a separate interferometer optical measurement path is associated with each coordinate axis (x, y) of the measurement table. On two sides of the measurement table, which are perpendicular to each other, measurement mirrors are mounted, which are located at the ends of the two interferometer optical measurement paths. The position of the measurement table may be determined interferometrically by means of the two measurement mirrors. The coordinate measurement table comprises a drive unit having a friction rod and a motor for each coordinate axis. The motor contacts one side of the friction rod with its motor shaft, while a pressure roller contacts the other side of the friction rod. At least one spring is provided, which biases the pressure roller, the friction rod and the motor shaft against each other with a pressing force. This results in the motor shaft frictionally engaging the friction rod so that the rotational movement of the motor is converted into a linear movement of the friction rod.

A further coordinate measurement table is described in German Patent No. DE 102 36 239 A1. A drive axis with a friction rod and a motor is provided for each coordinate axis. The motor contacts one side of the friction rod with its motor shaft, and a pressure roller contacts the other side of the friction rod. Furthermore, a pressure spring serves for biasing the mentioned parts against each other, whereby the motor shaft engages the friction rod frictionally and converts the rotational movement of the motor into a linear movement of the friction rod.

U.S. Pat. No. 4,378,709 discloses a friction drive for positioning a table. The friction bar is also driven directly by the motor shaft or the friction wheel. The friction bar is supported by a support roller on one side. On the other side of the friction bar, the friction wheel is supported by two support wheels. The support rollers are biased against the friction bar by a means. Automatic adaptation of the frictional force is not possible.

German Published Application No. DE 2005 036 718 A1 discloses a friction drive. The friction drive includes a friction wheel and a counterpart which is at least intermittently in frictional engagement with the friction wheel. There is further provided a force element designed to press the friction wheel and the counterpart against each other. The force element includes an air conduit for conducting a directed air flow 60 and at least one opening in the air conduit. The conducted air flow generates an air pressure in the area of the opening, which causes the frictional engagement. This arrangement cannot guarantee either that the friction wheel will adapt to the required load changes of the table movable in the X-coordinate direction and in the Y-coordinate direction.

International Patent Application No. WO 2007/010364 A2 discloses a friction drive. However, the document does not relate in any way to a drive or a linear drive of a friction bar. It only describes two wheels co-operating with each other, wherein one drives the other by friction drive.

Japanese Patent Abstract No. 2002-310264 A discloses a method and a device for controlling a friction drive provided with a soft means. For this purpose, a wheel co-operating with the other one is provided with a movable bar pressing the wheel into closer contact with the second wheel. The document does not disclose any arrangement as it is required in the present invention.

Coordinate measuring devices of the type mentioned above serve for determining the coordinates with a reproducibility in the range of less than 5 nm. Since this measurement accuracy, as mentioned above, depends significantly on the x/y positioning accuracy and the height process accuracy of the measurement table, extremely high requirements have to be met by the construction of the measurement table. Since, for relatively large masses to be moved, the frictional connection between motor and friction rod may be partly lost, a significant part of the originally desired positioning accuracy may be lost due to the associated slip. Undesired slipping effects may also occur during very fast advancing movements and high table accelerations.

BRIEF SUMMARY OF THE INVENTION

Therefore, it is an object of the present invention to provide an advancing means for a multi-coordinate measurement table allowing a precise positioning accuracy even for larger table masses and/or for high adjusting speeds and/or accelerations.

According to the invention, this object is achieved by an advancing means for a multi-coordinate measurement table including: a drive unit having a friction rod and a motor for each coordinate axis wherein the motor contacts one side of the friction rod with its motor shaft; at least one press roller being in contact with an opposite side of the friction rod; two support rollers contact the motor shaft, wherein the support rollers are arranged on a pressure roller holding element or a frame section; at least one pressing means for biasing the press roller, the friction rod, the two support rollers and the motor shaft against each other with a pressing force, whereby the motor shaft frictionally engages the friction rod and converts the rotational movement of the motor shaft into a linear movement of the friction rod; and, an adjusting means associated with the pressing means, wherein the adjusting means is drivable depending on the acceleration of the respective friction rod for variably adapting the pressing force, wherein the adjusting means includes a pivot arm with the two support rollers, which is pivotable around a stationary axis.

It is another object of the invention to provide a method for advancing a multi-coordinate measurement table allowing a precise positioning accuracy even for larger table masses and/or for high adjusting speeds and/or accelerations.

According to the invention, the above object is achieved by a method for controlling an advancing means for a multi-coordinate measurement table of a coordinate measuring device, comprising the steps of:

providing a drive unit, having a friction rod and a motor for each coordinate axis, wherein the motor contacts one side of the friction rod with its motor shaft and at least one press roller contacts the other side of the friction rod;

contacting two support rollers with each motor shaft, wherein the two support rollers being arranged on a pressure roller holding element or frame section;

providing at least one pressing means for biasing the press roller, the friction rod, the two support rollers and the motor shaft against each other with a pressing force, whereby the motor shaft frictionally engages the friction rod and thereby converting the rotational movement of the motor shaft into a linear movement of the friction rod; and, variably adapting the pressing force acting on the pressing means, wherein the adaptation depends on the acceleration of the respective friction rod such that the adjusting means includes a pivot arm with the two support rollers, which is pivoted around a stationary axis.

Furthermore, there is provided at least one pressing means biasing the pressure roller, the friction rod and the motor shaft against each other with a pressing force, whereby the motor shaft frictionally engages the friction rod and converts the rotational movement of the motor into a linear movement of the friction rod. In the inventive advancing means, the pressing means comprises an adjusting means drivable depending on the acceleration of the respective friction rod for variably adapting the pressing force. In this way, the pressing force may be increased as required, whereby undesired slippage between the rotating motor shaft and the linearly moved friction rod may be maximally reduced or eliminated. By reducing the pressing force when the motor is at rest or is rotating only slowly with correspondingly slow advancing movement of the friction rod and the measurement table coupled thereto, the stress to which the moved elements, particularly the motor shaft and the friction rod, are subject is reduced. In this way, the lifetime of these elements is increased, the probability of failure of the moved parts of the measurement table as a whole is reduced and the reliability of the whole system is thus improved. Finally, the inventive controllability of the pressing force of the rollers driving the friction rod serves for improving the precision of the measurement table, because all control commands for displacing the measurement table are executed with constant accuracy.

In a variant of the inventive advancing means, the pressure roller is arranged on a pressure roller holding element coupled to the adjusting means for varying the pressing force against the friction rod. In particular, a preferred embodiment of the invention provides that the motor shaft is in operative connection with one or two support rollers, wherein the support rollers support the motor shaft against the pressing force of the shafts or rollers biased against each other so that their bearings are not overloaded, but reliably withstand long-term stress. The support rollers and the press roller may, for example, be positioned in an adjustable frame, wherein the motor shaft, supported by the support rollers, is arranged on one side of the friction rod and the press roller is arranged on the other side. In particular, the adjusting means may include a linear motor. According to an advantageous variant, this linear motor of the adjusting means may be implemented as a piezo-drive. However, the invention also includes other types of linear drives, for example, electromagnetically, hydraulically or pneumatically operated drives.

Depending on the required adjusting travel, a piezo-drive used as a linear motor typically includes a piezo-stack consisting of a plurality of identical piezo-disks whose very small individual travel may be added by serial arrangement to yield a larger total travel. The special advantage of such piezo linear drives is the very precise control of a given travel and the very high adjusting speed, which is much higher than the adjusting speed of the linear drives mentioned as alternatives. Thus, adjusting travels may typically be performed with such a piezo-drive that require only about thirty percent (30%) of the adjusting time for the same adjusting travel as compared to a comparable electromagnetic drive.

One embodiment of the inventive advancing means may provide that the adjusting means includes a pivot arm pivotable around a stationary axis, and that the linear motor is arranged on the free end of the pivot arm. This arrangement allows the realization of a very simple and low-cost bearing and arrangement of the parts. In addition, the free end of the piezo-stack does not need to co-operate directly or via a roller arranged thereon with the friction rod. The pivot arm bearing may be implemented much more easily in terms of construction and offers the desired precision for correspondingly playfree bearings. If necessary, a force measuring means, for example, in the form of a force measuring sensor or a so-called load cell, may be arranged between the linear drive and the adjusting means. With the help of this sensor, the pressing force acting on the friction rod may be precisely regulated at any time.

In particular, the multi-coordinate measurement table may be an X/Y-coordinate measurement table equipped with an inventive advancing means according to one of the above described embodiments. In this advancing means, the bearings of the pressure roller may be implemented, for example, as ball bearings or self-aligning ball bearings or needle bearings. These bearings should have a minimum of bearing play so as not to affect the adjusting accuracy. At the same time, however, the bearings should also move very smoothly and should not cause any breakaway torque for the whole system.

It is to be noted here that the invention also relates to a corresponding method for controlling such an advancing means, wherein the pressing force for the pressure rollers and/or the motor shaft is variably set depending on the advancing speed and/or the acceleration of the friction rod. The above aspects of the inventive advancing means equally apply to the method.

BRIEF DESCRIPTION OF THE DRAWINGS

In the following detailed description, embodiments will explain the invention and its advantages in more detail with reference to the accompanying figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
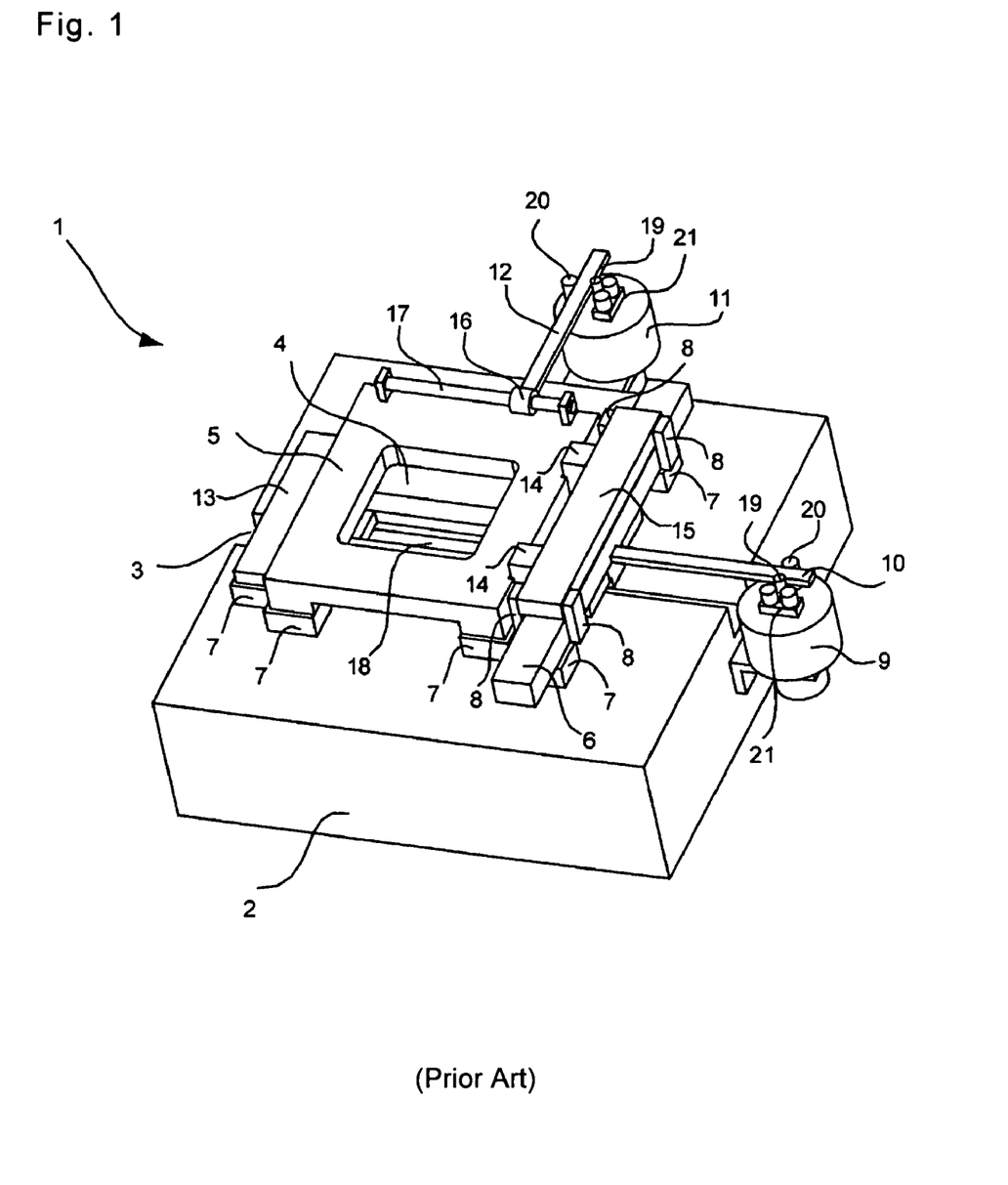
FIG. 1 shows a schematic perspective view of a prior art coordinate measuring device.
Figure 2:
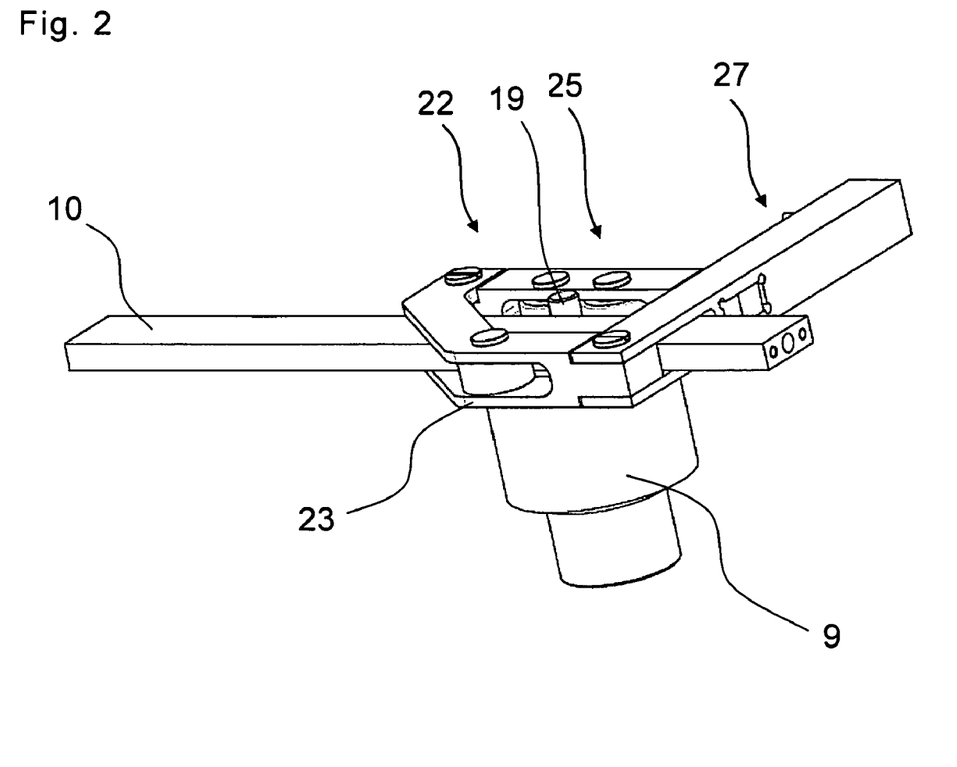
FIG. 2 shows a perspective representation of an advancing means with a friction rod, which may be part of a multi-coordinate measuring device of FIG. 1.
Figure 3:
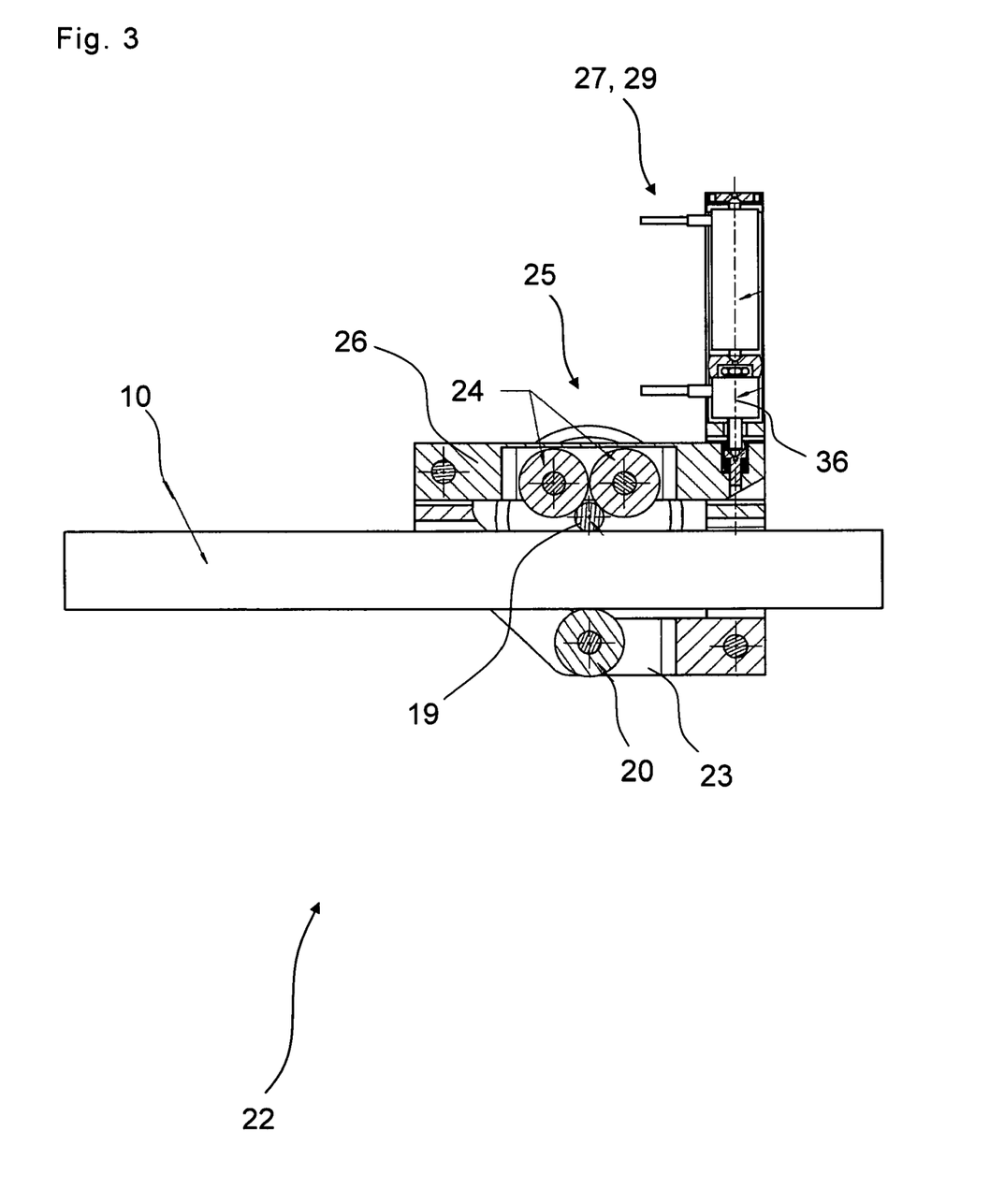
FIG. 3 shows a schematic representation of the advancing means of FIG. 2 with the linearly displaceable friction rod.
Figure 4:
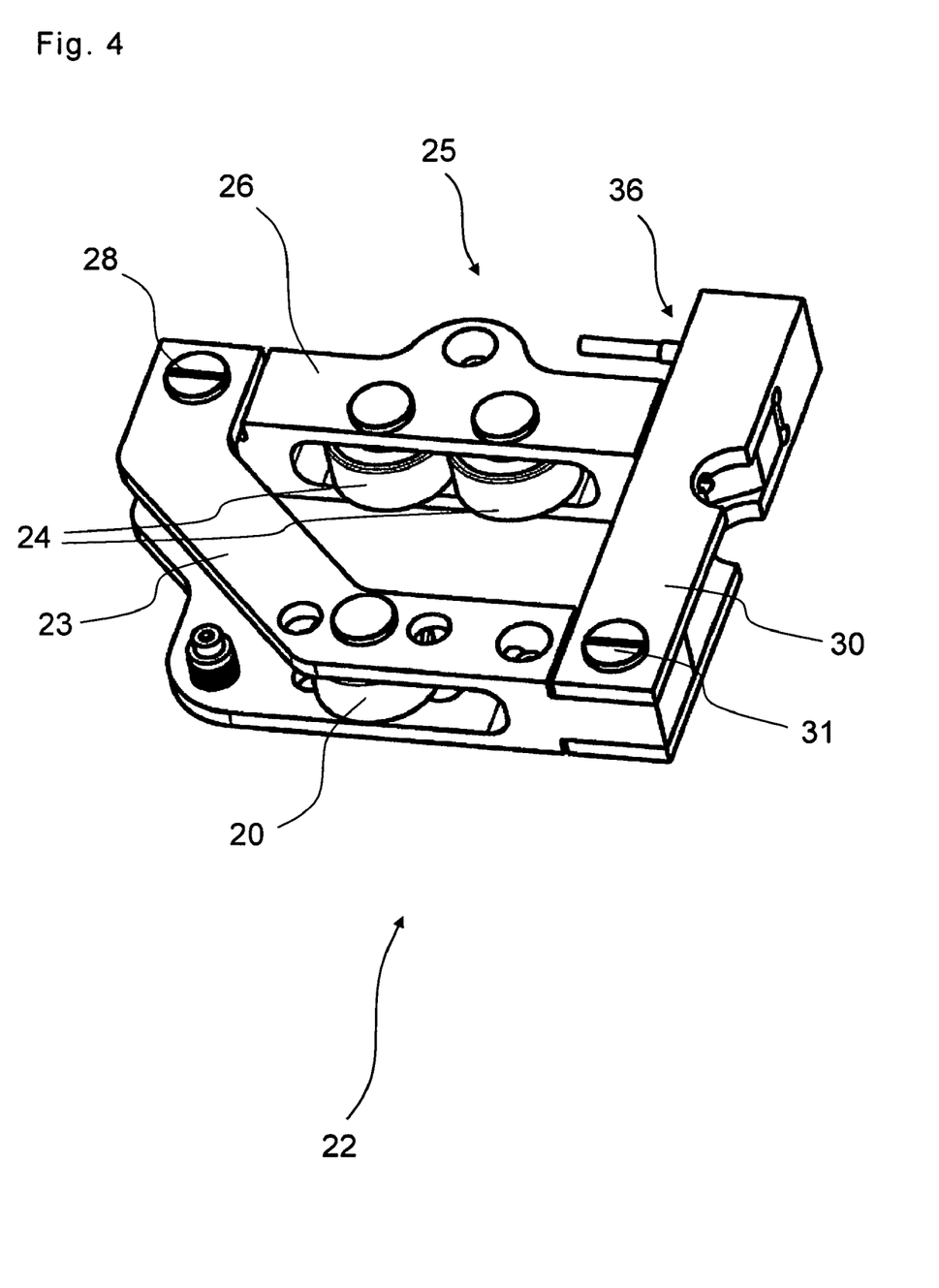
FIG. 4 shows the advancing means of FIG. 3 in a perspective detail view.

The schematic perspective representation of FIG. 1 shows a multi-coordinate measuring device or a multi-coordinate measurement table according to prior art, while FIGS. 2, 3 and 4 serve to explain the structure and operation of an inventive advancing means for such a multi-coordinate measurement table in more detail.

The representation of FIG. 1 shows a three-dimensional view of a completely assembled coordinate measurement table 1 as described, for example, in German Patent No. DE 102 36 239 A1. Base part 2 with middle part 4 arranged above it is shown. Middle part 4 is suspended on y-guide element 6 and additional support element 13, which are both supported on the plane surface of base part 2 by means of supporting air bearings 7 and are slidingly displaceable thereon. For the displacement of middle part 4 in the x-direction, base part 2 comprises x-guide element 3 implemented as a groove. Guide air bearings 8 arranged on middle part 4, which engage x-guide element 3 for guiding the movement in the x-direction, are concealed in this view.

For achieving the x-movement, middle part 4 is connected to x-friction rod 10 transmitting the rotational movement of x-drive element 9 to middle part 4. Opposite to motor shaft 19 of x-drive element 9, pressure roller 20 is arranged in frictional connection with x-friction rod 10. For this purpose, pressure roller 20, x-friction rod 10 and motor shaft 19 are biased against each other with a pressing force of at least one spring (not shown) so that motor shaft 19 frictionally engages the x-friction rod.

Motor shaft 19 of x-drive element 9 has associated therewith compensation means 21 generating a compensation force in the direction opposite to the pressing force, the compensation force being directed to motor shaft 19 and compensating the pressing force. This allows an adaptation of the pressing force so that the wear of motor shaft 19 and the friction rod is maximally reduced.

Above middle part 4, there is arranged table body 5 extending beyond middle part 4. Table body 5 is also supported by the surface of base part 2 by means of several supporting air bearings 7 and is slidingly displaceable in the y-direction along y-guide element 6. Since y-guide element 6 carries middle part 4, which is movable in the x-direction, table body 5 is forced to follow each movement of middle part 4 in the x-direction.

On the outer side of table body 5 that faces y-guide element 6, there are arranged two holding elements 14 where y-straightedge 15 is mounted. On the outer side of y-straightedge 15, there are arranged several guide air bearings 8, which are positioned against the outer side of y-guide element 6 and ensure precise movement of table body 5 along y-guide element 6. For achieving the y-movement, y-drive element 11, whose rotational movement is transmitted to table body 5 with the help of y-friction rod 12, is stationarily arranged on base part 2.

At its one end, y-friction rod 12 engages push bar 17 extending in the x-direction by means of annular air bearing 16 and thus transmits the y-movement of y-friction rod 12 to table body 5. Pressure roller 20 is in frictional connection with y-friction rod 12 opposite motor shaft 19. For this purpose, pressure roller 20, y-friction rod 12 and motor shaft 19 are biased against each other with the pressing force of at least one spring (not shown) so that motor shaft 19 frictionally engages y-friction rod 12.

Motor shaft 19 of y-drive element 11 also has associated therewith compensation means 21 generating a compensation force in the direction opposite to the pressing force, the compensation force being directed to motor shaft 19 and compensating the pressing force. Base part 2, middle part 4 and table body 5 each have inner opening 18 located one above the other, which keep a transmitted light area free for transmitted light measurements.

FIG. 2 shows a perspective representation of an advancing means having friction rod 10, which may be part of multi-coordinate measuring device 1 according to FIG. 1. The advancing means includes drive unit 22 explained in detail with reference to the following figures. Drive element 9 in the form of an electric drive motor drives motor shaft 19 directly influencing friction rod 10, whereby the rotational movement of motor shaft 19 is translated to a linear advancing movement of friction rod 10. Drive element 9 is arranged beneath but not connected to frame 23. Frame 23 comprises pressing means 25 which, in cooperation with adjusting means 27, provides a constant force pressing motor shaft 19 against friction rod 10 and thus prevents slippage.

FIG. 3 shows a schematic representation of the advancing means of FIG. 2 with linearly displaceable friction rod 10. It can be seen that two support rollers 24 for motor shaft 19 are arranged on a pressure roller holding element or on pivot arm 26 of frame section 23 and are positioned to be rotatable. Pivot arm 26 is coupled to adjusting means 27 for varying the pressing force of support rollers 24 against motor shaft 19. On the other side of closed frame 23, press roller 20 is arranged and positioned to be rotatable, so that friction rod 10 may be guided between motor shaft 19 and press roller 20 and may be linearly displaced by the drive of the motor. The arrangement of two support rollers 24 on pivot arm 26 of pressing means 25 allows the pressing force acting between motor shaft 19 and press roller 20 to be varied, so that friction rod 10 may be guided without slippage.

Pivot arm 26 of pressing means 25, which is mounted on frame 23 on one side, is actuated by adjusting means 27 implemented as linear motor 29. According to a preferred embodiment of the present invention, particularly a piezo-drive is used as such linear motor 29, because such a piezo-drive may perform high-precision adjusting movements in a very short time, so that, depending on the advancing speed and the acceleration of friction rod 10, two support rollers 24 may be pressed with more or less force towards motor shaft 19 or press roller 20. Force measuring sensor 36 is arranged between linear motor 29 and pivot arm 26 to allow setting an appropriate pressing force at the piezo-drive depending on the advancing speed of friction rod 10.

Figure 5:
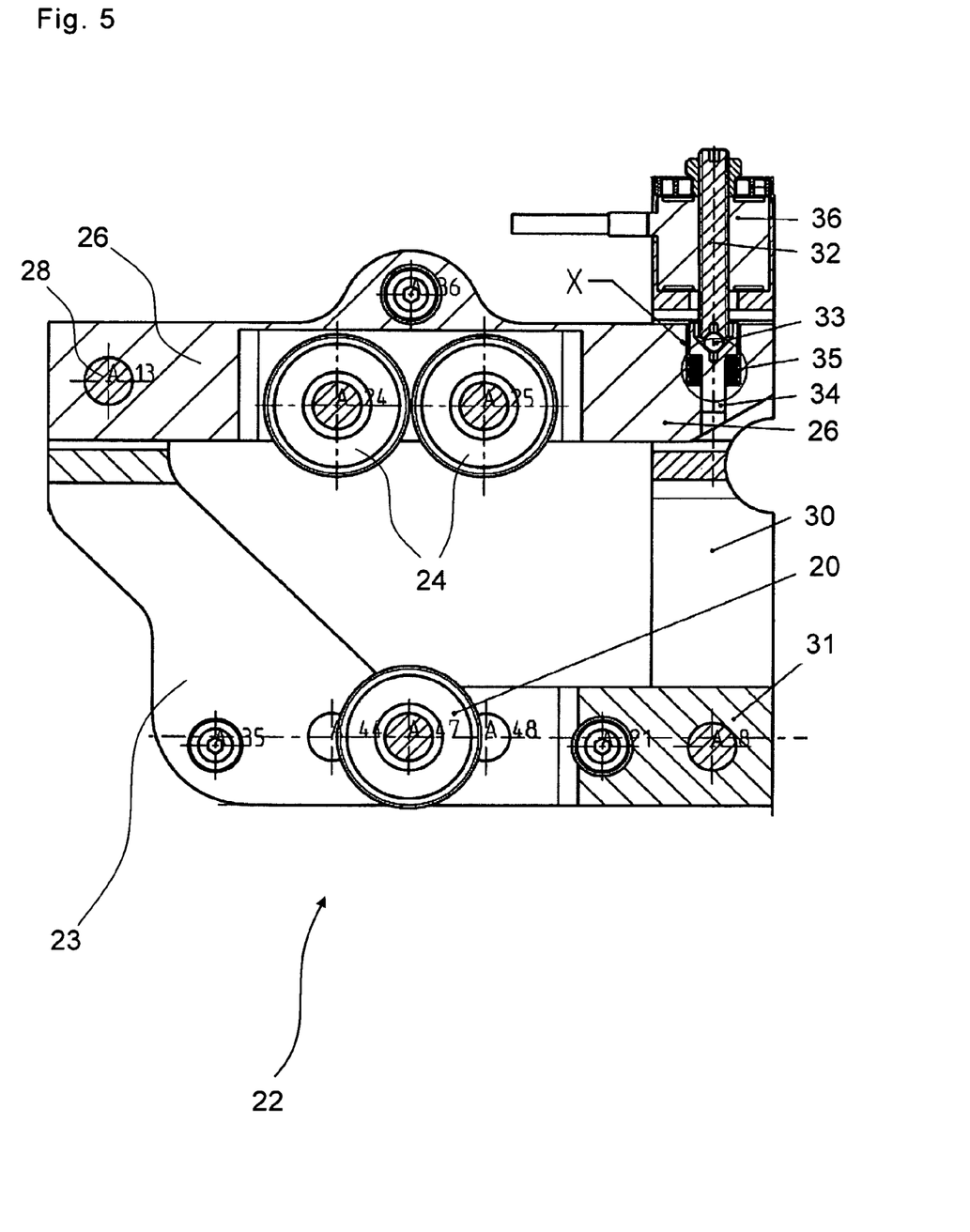
FIG. 5 shows a further detail view of the advancing means of FIG. 4.

The schematic representation of FIG. 4 shows a further perspective view of frame 23 of drive unit 22 with the individual components arranged therein. FIGS. 4 and 5 show that two support rollers 24 are arranged on the support roller holding element or on pivot arm 26 of frame section 23. Pivot arm 26 is coupled to an adjusting means (not shown) for varying the pressing force of support rollers 24 against the motor shaft (not shown). On the other side of closed frame 23, single press roller 20 is positioned so that the friction rod may be guided between motor shaft 19 and press roller 20 and may be linearly displaced by the drive of the motor. The only part of the adjusting means shown in FIG. 4 is force measuring sensor 36, which is influenced by an actuator of the linear motor. Pivot arm 26 is pivotable around stationary axis 28, wherein the linear motor is arranged on the free end of pivot arm 26 to convert the linear adjusting movement into very small pivoting angles of pivot arm 26, finally resulting in the desired approaching movements of support rollers 24 against motor shaft 19.

For linear motor 29 and force measuring sensor 36 to be mountable, it is arranged on frame section 30 securely connected to the rest of frame 23, whose connection 31 to frame 23 may be implemented, for example, as a screw connection. The secure anchoring of force measuring sensor 36 of adjusting means 27 on frame section 30 is illustrated in the detail view of FIG. 5. Adjusting axis 32 of force measuring sensor 36, which is linearly displaceable in a direction parallel to the longitudinal extension of frame section 30, transmits the adjusting movements of the piezo-drive to pivot arm 26 via coupling element 33 and connection rod 34. Disk spring stack 35 is arranged between step-like connection rod 34 and the corresponding receptacle of pivot arm 26, wherein its defined spring rate provides for a certain attenuation of the adjusting movements on the one hand and for a desired biasing force of pivot arm 26 against press roller 20 or the friction rod therebetween on the other hand.

Figure 6:
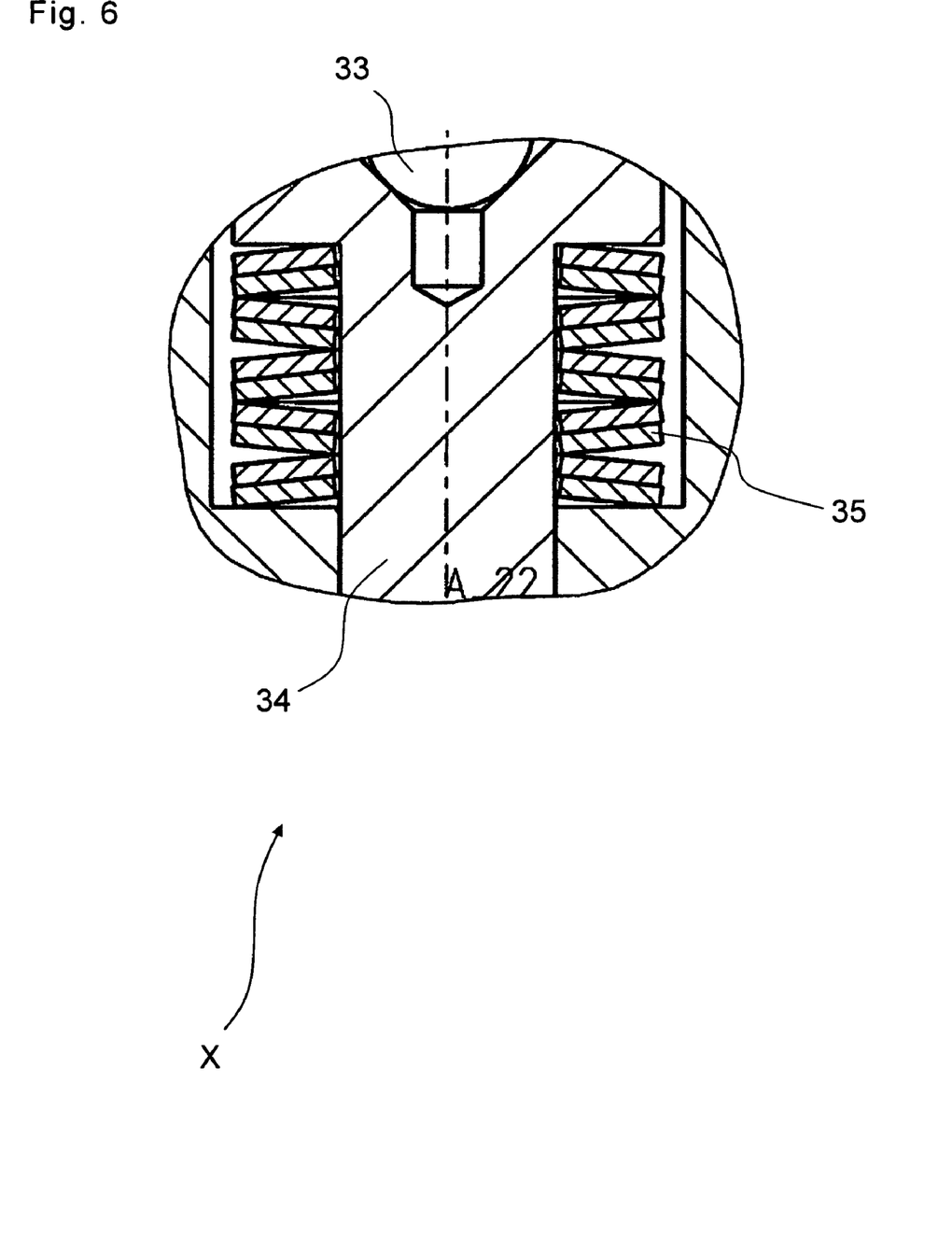
FIG. 6 shows a detail view X from FIG. 5 in longitudinal section.

The detail view of FIG. 5 shows the details of this advancing means, while FIG. 6 is a detail view of FIG. 5 illustrating a disk spring stack and its arrangement. The illustration of a friction rod was omitted in FIGS. 4 and 5 for reasons of clarity. The basic function of the illustrated drive unit for the friction rods for driving the measurement table, however, does not essentially differ from the known variant shown in FIG. 1. In addition, it is to be noted at this point that the multi-coordinate measurement table does not necessarily have to be a so-called X/Y coordinate measurement table, but that there are also contemplated other variants of a measurement table horizontally displaceable in one direction or in several directions for which the inventive advancing means may be used advantageously.

FIG. 6 shows a detail view X from FIG. 5 in longitudinal section. It shows disk spring stack 35 arranged between pivot arm 26 and connection rod 34 of force measuring sensor 36 or the linear motor. Coupling element 33 is shown in more detail, which may, for example, be implemented as a ball joint as in the shown embodiment.

According to the present invention, there is provided a control means (not shown) which operates to make adjusting means 27 or linear motor 29 drive pressing means 25 so that the pressing force is variably controlled depending on the acceleration of the respective friction rod. In this way, a slipless power transmission may be ensured even for fast adjusting movements and the high accelerations of the friction rod associated therewith without having to maintain the required high pressing force also for slow adjusting movements or with the motor at rest. A permanent high pressing force would result in relatively high stress for the bearings of motor shaft 19 and thus in relatively strong wear.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An advancing means for a multi-coordinate measurement table of a coordinate measuring device, said measurement table comprising at least one coordinate axis, said advancing means comprising:

a drive unit arranged for each of said at least one coordinate axis, each of said drive unit comprising a friction rod and a motor, said motor comprising a motor shaft, wherein said motor shaft contacts a first side of said friction rod;

a closed frame comprising a first frame section and a second frame section, wherein a pivot arm is pivotable about a stationary axis of said first frame section and said second frame section is connected to said first frame section by a connection;

at least one press roller arranged in said first frame section and in contact with a second side of said friction rod, wherein said first side is opposite said second side;

two support rollers arranged on said pivot arm and in contact with said motor shaft;

at least one pressing means arranged to bias said at least one press roller, said friction rod, said two support rollers and said motor shaft against each other with a pressing force, wherein said motor shaft frictionally engages said friction rod and converts rotational movement of said motor shaft into a linear movement of said friction rod; and, an adjusting means comprising said pivot arm and associated with said pressing means, wherein said pivot arm is coupled to said adjusting means, said two support rollers are arranged on said pivot arm, said pivot arm is pivotable about said stationary axis, said adjusting means comprises a linear motor and a force measuring sensor arranged between said linear motor and said pivot arm and said adjusting means is arranged to variably adapt said pressing force depending on an acceleration of said friction rod.

2. The advancing means of claim 1, wherein said at least one press roller and/or said two support rollers are arranged on a pressure roller holding element or a frame section, said holding element or said frame section coupled to said adjusting means for varying said pressing force against said friction rod.

3. The advancing means of claim 1, wherein said linear motor of said adjusting means comprises a piezo-drive.

4. The advancing means of claim 3, wherein said linear motor is arranged on a free end of said pivot arm.

5. The advancing means of claim 1, wherein each of said at least one press roller and said two support rollers comprise a bearing selected from the group consisting of: a ball bearing, a self-aligning ball bearing and a needle bearing.

6. A method for controlling an advancing means for a multi-coordinate measurement table of a coordinate measuring device, said measurement table comprising at least one coordinate axis, said method comprising the steps of:
   providing a drive unit arranged for each of said at least one coordinate axis, each of said drive unit comprising a friction rod and a motor, said motor comprising a motor shaft, wherein said motor shaft contacts a first side of said friction rod and at least one press roller contacts a second side of said friction rod, said first side is opposite said second side;
   providing a closed frame comprising a first frame section and a second frame section, wherein a pivot arm is pivotable about a stationary axis of said first frame section, said second frame section is connected to said first frame section by a connection and said at least one press roller is arranged in said first frame section;
   contacting two support rollers arranged on said pivot arm with said motor shaft;
   providing at least one pressing means arranged to bias said at least one press roller, said friction rod, said two support rollers and said motor shaft against each other with a pressing force, wherein said motor shaft frictionally engages said friction rod and converts rotational movement of said motor shaft into a linear movement of said friction rod; and,
   variably adapting said pressing force acting on said pressing means, wherein an adjusting means comprises said pivot arm coupled to said adjusting means, said two support rollers are arranged on said pivot arm, said pivot arm is pivotable about said stationary axis, said adjusting means comprises a linear motor and a force measuring sensor arranged between said linear motor and said pivot arm, and said adapting depends on an acceleration of said friction rod.

\* \* \* \* \*